(12) United States Patent
Rao et al.

(10) Patent No.: US 10,416,874 B2
(45) Date of Patent: Sep. 17, 2019

(54) METHODS, APPARATUSES, AND DEVICES FOR PROCESSING INTERFACE DISPLAYS

(71) Applicant: GUANGZHOU UCWEB COMPUTER TECHNOLOGY CO., LTD., Guangzhou (CN)

(72) Inventors: Liang Rao, Guangzhou (CN); Yaohang Xiao, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 540 days.

(21) Appl. No.: 15/078,345

(22) Filed: Mar. 23, 2016

(65) Prior Publication Data

US 2017/0123624 A1 May 4, 2017

(30) Foreign Application Priority Data

Nov. 2, 2015 (CN) .......................... 2015 1 0741944

(51) Int. Cl.
*G06F 3/0488* (2013.01)
*G06F 3/0484* (2013.01)
*G06F 3/0481* (2013.01)

(52) U.S. Cl.
CPC .......... *G06F 3/0488* (2013.01); *G06F 3/0481* (2013.01); *G06F 3/04845* (2013.01)

(58) Field of Classification Search
CPC .................................................... G06F 3/0488
USPC ....................................................... 715/802
See application file for complete search history.

(56) References Cited

U.S. PATENT DOCUMENTS

| 9,769,510 B2* | 9/2017 | Deen | H04N 21/25891 |
| 2002/0015064 A1* | 2/2002 | Robotham | G06F 3/0481 |
| | | | 715/863 |
| 2010/0306680 A1* | 12/2010 | Quennesson | G06F 8/38 |
| | | | 715/763 |
| 2012/0254729 A1 | 10/2012 | Wan | |
| 2013/0211923 A1* | 8/2013 | Yuill | G06Q 30/0276 |
| | | | 705/14.72 |

(Continued)

FOREIGN PATENT DOCUMENTS

| CN | 102117290 A | 7/2011 |
| CN | 103699313 A | 4/2014 |
| CN | 104063393 A | 9/2014 |

OTHER PUBLICATIONS

First Search for Chinese Patent Application No. 201510741944.9 dated Jun. 20, 2019, 2 pages.

(Continued)

*Primary Examiner* — William D Titcomb
(74) *Attorney, Agent, or Firm* — Sheppard Mullin Richter & Hampton LLP

(57) ABSTRACT

Methods and apparatuses are provided for processing interface displays. The disclosed methods and apparatuses may detect a gesture operation on a current interface of a computing device. The current interface is pre-divided into a first region and a second region. The first region is configured to move in accordance with the detected gesture operation. The disclosed methods and apparatuses may switch from the current interface to a new interface that includes content of the first region when the gesture operation is determined to be corresponding to a predetermined gesture.

20 Claims, 8 Drawing Sheets

(56) References Cited

U.S. PATENT DOCUMENTS

| | | | |
|---|---|---|---|
| 2014/0168076 A1* | 6/2014 | Hicks | G06F 3/0488 345/157 |
| 2014/0253463 A1* | 9/2014 | Hicks | G06F 3/03545 345/173 |
| 2014/0253464 A1* | 9/2014 | Hicks | G06F 3/03545 345/173 |
| 2014/0253466 A1* | 9/2014 | Brewer | G06F 3/03545 345/173 |
| 2014/0365956 A1* | 12/2014 | Karunamuni | G06F 3/04847 715/788 |
| 2014/0380244 A1* | 12/2014 | Tecarro | G06F 3/0482 715/838 |
| 2015/0058462 A1* | 2/2015 | Tafel | G06F 16/44 709/223 |
| 2015/0067601 A1* | 3/2015 | Bernstein | G06F 3/0488 715/823 |
| 2015/0067605 A1* | 3/2015 | Zambetti | G06F 3/0485 715/830 |
| 2015/0100876 A1* | 4/2015 | Neugebauer | G06F 17/241 715/233 |
| 2015/0105017 A1* | 4/2015 | Holmquist | G06F 3/0346 455/41.2 |
| 2015/0113407 A1* | 4/2015 | Hoffert | G06F 3/0482 715/720 |
| 2015/0149899 A1* | 5/2015 | Bernstein | G06F 3/016 715/702 |
| 2015/0185982 A1* | 7/2015 | Hicks | G06F 3/0483 715/776 |
| 2015/0234562 A1* | 8/2015 | Ording | G06F 3/0485 715/784 |
| 2015/0347403 A1* | 12/2015 | MacArthur | G06F 3/04883 715/254 |
| 2016/0063611 A1* | 3/2016 | Davis | G06Q 30/0639 705/26.63 |
| 2016/0078106 A1* | 3/2016 | Kennewick, Sr. | G06F 17/30554 707/706 |
| 2016/0103838 A1* | 4/2016 | Sainani | G06F 3/0488 707/725 |
| 2016/0127303 A1* | 5/2016 | Abou Mahmoud | H04L 51/32 709/206 |
| 2016/0188316 A1* | 6/2016 | Liang | G06F 8/658 717/169 |
| 2017/0109451 A1* | 4/2017 | Kennewick, Sr. | G06F 17/30867 |

OTHER PUBLICATIONS

First Office Action for Chinese Patent Application No. 201510741944.9 dated Jun. 28, 2019, with machine English translation, 40 pages.

\* cited by examiner

METHODS, APPARATUSES, AND DEVICES FOR PROCESSING INTERFACE DISPLAYS

CROSS-REFERENCE TO RELATED APPLICATION

This application claims priority to and the benefits of Chinese Patent Application Serial No. 201510741944.9, filed with the State Intellectual Property Office of P. R. China on Nov. 2, 2015, which is incorporated herein by reference in its entirety.

TECHNICAL FIELD

The present disclosure relates to the field of mobile Internet technologies and, in particular, to methods, apparatuses, and devices for processing interface displays.

BACKGROUND

At present, with the continuous development of the technologies of smart mobile computing devices, users increasingly prefer to use mobile computing devices to browse a variety of web content, e.g., text, news, videos, pictures, images, animations, etc. Mobile computing devices generally display a variety of web content through various browsers.

When a browser displays a web page of web content, e.g., news information, one way of displaying web content is to use a common waterfall layout. The web content displayed may be called an information flow. Due to the limited size of the screen of the mobile computing device, generally only a part of the content of such information flow is displayed in a current interface of the browser, while other parts are not displayed. If it is detected that the user swipes the screen of the mobile computing device, the web content not displayed will be displayed in the current interface.

However, the content displayed in a current interface of a typical browser may include many types of information that have different functions and may not need to be all displayed in the current interface. For example, the displayed content may include news information as well as a navigation bar, a search portal, etc. Therefore, to improve user experience, there is a need for a method that implements a natural transition or switching between the different functional content to be displayed in the interface.

SUMMARY

Embodiments of the present disclosure are directed to methods, apparatuses, and devices for processing interface displays. Various embodiments of the disclosure may include one or more of the following aspects.

One aspect of the present disclosure involves a method for processing interface displays. The method may include detecting a gesture operation on a current interface, the current interface being pre-divided into a first region and a second region. The first region may be configured to move in accordance with the detected gesture operation. The method may further include switching from the current interface to a new interface that includes content of the first region when the gesture operation is determined to be corresponding to a predetermined gesture.

According to some embodiments, the first region may include one or more of a navigation region and a content region. The content region may include an information flow. The information flow may include a collection of content of multiple information channels, and a collection of content of at least one channel is at least partially displayed in the current interface. The new interface may be a home page of an information flow. The gesture operation may be a swipe-up gesture or a swipe-down gesture.

According to some embodiments, the method may further include switching to the new interface when the gesture operation is determined to be corresponding to a predetermined gesture and the gesture operation is determined to be located in the first region. The new interface may include the content of the first region and content of a third region that is newly added and displayed at a top position. The third region may be a title bar region of an information flow. The content of the third region may be displayed at the top position by a sliding-in action in a predetermined direction.

According to some other embodiments, the method may further include, when the gesture operation is a swipe-down gesture, switching to the new interface after the content of the first region is refreshed in the backend. The method may also include, when the gesture operation is a swipe-up gesture, moving the content of the first region downward along with the gesture, then rebounding and moving the content of the first region upward, and combining the content of the first region after being refreshed in the backend with the content of the third region to form the new interface. The method may further include, after the release of the swipe-down gesture is detected, making the content of the first region rebound to move the content of the first region upward to combine with the content of the third region to form the new interface.

According to some other embodiments, the method may further include, when the gesture operation is the swipe-down gesture, moving the content of the first region downward along with the gesture, making the content of the second region fade away, displaying a refresh prompt at a position in the second region, and refreshing the content of the first region in the backend. The method may also include drawing and deforming a lower edge of the second region downward while making the content of the second region fade away. The method may further include drawing and deforming the lower edge of the second region downward according to a quadratic Bezier curve. The method may further include stopping the movement of the content of the first region after moving the content of the first region downward along with the gesture for a predetermined distance.

According to some other embodiments, the method may also include, when the gesture operation is the swipe-up gesture, moving the content of the first region upward along with the gesture to combine with the content of the third region to form the new interface. The method may also include, when determining that a moving distance of the swipe-up gesture is greater than or equal to a predetermined threshold distance, or a moving speed of the swipe-up gesture is greater than or equal to a predetermined threshold speed, combining the content of the first region with the content of the third region to form the new interface. The method may also include, when the gesture operation is the swipe-up gesture, generating a picture of the first region and moving the picture upward along with the gesture. The picture may be generated by converting the content of the first region into a picture file format. The method may further include, when the moving speed of the swipe-up gesture is greater than or equal to the predetermined threshold speed, applying a rebound animation to the content of the first region when combining the content of the first region with the content of the third region.

According to some other embodiments, the method may further include applying a masking effect on the content of the second region and covering the content of the second region with the content of the first region and the content of the third region. The method may further include, when combining the content of the first region with the content of the third region, displaying an outer shadow that fades in at an edge region connecting the first region and the third region.

According to some other embodiments, the method may further include displaying at least one of one or more icons of a toolbar region of the current interface in a toolbar region of the new interface. The method may further include, after switching to the new interface and detecting that a back-to-home page icon is clicked, returning to a home page and displaying in the first region in the home page the content of an information channel displayed in the new interface.

Another aspect of the present disclosure involves an apparatus for processing interface displays. The apparatus may include a detection module that detects a gesture operation on a current interface, the current interface being pre-divided into a first region and a second region. The first region may be configured to move in accordance with the detected gesture operation. The apparatus may further include a switching module that switches from the current interface to a new interface that includes content of the first region when the gesture operation is determined to be corresponding to a predetermined gesture.

According to some embodiments, the detection module may include a first detection sub-module that determines whether the gesture operation corresponds to a predetermined gesture, and a second detection sub-module that determines whether the gesture operation is located in the first region. The switching module may switch from the current interface to the new interface when the gesture operation corresponds to the predetermined gesture and is located in the first region.

According to some embodiments, the switching module may include a recognition sub-module that determines whether the gesture operation is a swipe-up gesture or a swipe-down gesture, and a processing sub-module that performs the switching from the current interface to the new interface that includes the content of the first region and content of a new third region. The third region may be displayed at a top position of the new interface. The switching module may further include a refreshing module that refreshes the content of the first region in the backend. The switching module may further include a toolbar processing module that displays at least one of one or more icons of a toolbar region of the current interface in a toolbar region of the new interface, and/or after detecting that a back-to-home page icon is clicked on the new interface, may return to a home page and display in the first region in the home page the content of an information channel displayed in the new interface.

According to some other embodiments, the processing sub-module may include a first processing module that, when the recognition sub-module determines that the gesture operation is the swipe-up gesture, moves the content of the first region upward along with the gesture to combine with the third region. When the recognition sub-module determines that a moving distance of the swipe-up gesture is greater than or equal to a predetermined threshold distance, or a moving speed of the swipe-up gesture is greater than or equal to a predetermined threshold speed, the first processing module may combine the content of the first region with the content of the third region to form the new interface. When the recognition sub-module determines that the gesture operation is the swipe-up gesture, the first processing module may also generate a picture of the first region and move the picture upward along with the gesture.

According to some other embodiments, after the recognition sub-module determines that the gesture operation is the swipe-down gesture, the processing sub-module may also include a second processing module that switches to the new interface including the refreshed content of the first region and the content of the third region. When the recognition sub-module determines that the gesture operation is the swipe-down gesture, the second processing module may also move the content of the first region downward with the gesture while refreshing the content of the first region, and then rebound and move the content of the first region upward, and combine the refreshed content of the first region with the third region. When the recognition sub-module determines that the swipe-down gesture is released, the second processing module may make the content of the first region rebound to move the content of the first region upward to combine with the content of the third region to form the new interface. When the recognition sub-module determines that the gesture operation is the swipe-down gesture, the second processing module may also move the content of the first region downward along with the gesture, make the content of the second region fade away, display a refresh prompt at a position in the second region, and refresh the content of the first region in the backend.

Another aspect of the present disclosure involves a device for processing interface displays. The device may include a non-transitory memory storing instructions and one or more processors that execute the stored instructions to cause the device to perform operations. The operations may include detecting a gesture operation on a current interface, the current interface being pre-divided into a first region and a second region, wherein the first region is configured to move in accordance with the detected gesture operation, and switching from the current interface to a new interface that includes content of the first region when the gesture operation is determined to be corresponding to a predetermined gesture.

Another aspect of the present disclosure involves a non-transitory computer-readable storage medium having processor-executable program codes, characterized in that the program codes may cause a processor to execute the following steps, including: detecting a gesture operation on a current interface, the current interface being pre-divided into a first region and a second region, wherein the first region is configured to move in accordance with the detected gesture operation; and switching from the current interface to a new interface that includes content of the first region when the gesture operation is determined to be corresponding to a predetermined gesture.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the present disclosure is not limited in its application to the details of construction and to the arrangements of the components set forth in the following description or illustrated in the drawings. The present disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate exemplary embodiments of the present disclosure, and, together with the description, serve to explain the principles of the disclosure.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. The materials, methods, and examples are illustrative only and are not intended to be necessarily limiting.

While the present disclosure is described herein with reference to illustrative embodiments of particular applications, such as devices, methods, and systems for processing interface displays, it is understood that the embodiments described herein are not limited thereto. Those having ordinary skill in the art and access to the teachings provided herein will recognize additional modifications, applications, embodiments, and substitution of equivalents that all fall within the scope of the present disclosure. For example, the devices and methods of the present disclosure may be employed for any suitable application, including, but not limited to, displaying web content or web pages in a browser interface.

Devices disclosed herein can also be used with other suitable methods for displaying web content. Such devices may include, but are not limited to, a general-purpose computer, a computer cluster, a terminal, a mainframe, a mobile computing device, or any other computing device capable of connecting to a network. As an additional example, a mobile computing device may include, but is not limited to, a cell phone, a smart phone, a personal digital assistant, a tablet, or a laptop. Accordingly, the disclosure is not to be considered as limited by the foregoing or following descriptions.

Embodiments of the present disclosure provide a method for implementing a natural transition or switching of an interface display in accordance with a gesture operation.

Figure 1:
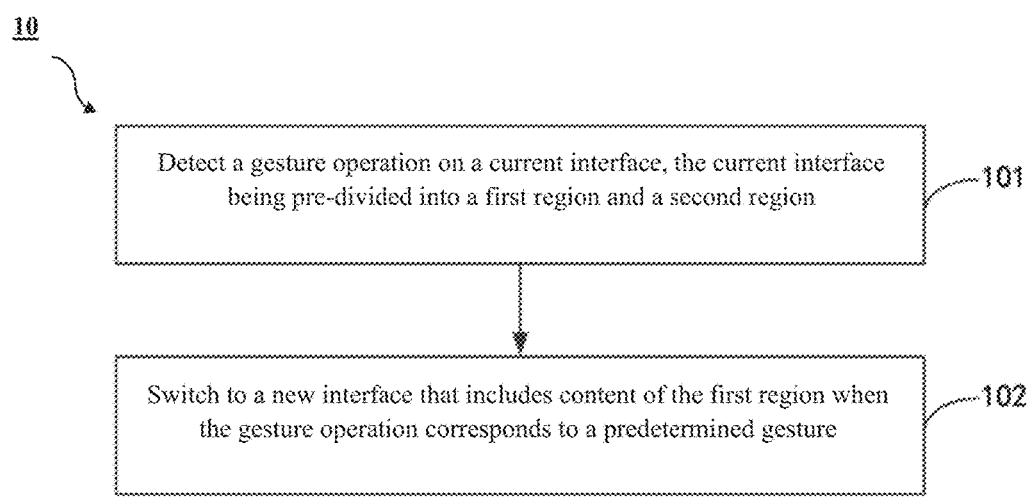
FIG. 1 depicts a flow chart illustrating a method for processing interface displays, according to embodiments of the present disclosure.

FIG. 1 depicts a flow chart of an exemplary method 10 for processing interface displays, according to embodiments of the present disclosure.

As shown in FIG. 1, the method 10 includes:

Step 101: Detect a gesture operation on a current interface, the current interface being pre-divided into a first region configured to move along with a gesture and a second region configured not to move along with the gesture.

As described herein, the gesture operation may be any suitable one of various different gesture operations, for example, a swipe-up operation, a swipe-down operation, and so on. Therefore, the gesture operation of a user on a current interface is detected in this step. The current interface may be an interface of a browser displaying one or more types of content, such as web content, on a screen of a computing device. In addition, the current interface is pre-divided into a first region and a second region. Upon detecting the gesture operation, the first region may move and the second region may not move.

Step 102: Switch to a new interface that includes content of the first region when the detected gesture operation corresponds to a predetermined gesture.

The first region may include one or more sub-regions, such as a navigation region and a content region. The content region may be an information flow or may display at least a part of an information flow.

The information flow may include a collection of contents of multiple information channels, and a collection of the content of at least one information channel is at least partially displayed in the current interface. The new interface may become a home page of the information flow.

In some embodiments, step 102 further includes switching to the new interface when the gesture operation corresponds to a predetermined gesture and the detected gesture operation is located in the first region.

The gesture operation may be a swipe-up gesture or a swipe-down gesture. The switching to the new interface that includes content of the first region may include switching to the new interface that includes content of the first region and content of a third region that is newly added.

In some situations, when the gesture operation is a swipe-up gesture, the content of the first region moves upward along with the gesture to combine with the content of the third region, which is newly added and displayed at a top position, to form the new interface. In other situations, when the gesture operation is a swipe-down gesture, the content of the first region is refreshed in the backend while moving downward along with the gesture and then rebounds to move upward. In such instances, the content of the first region, after being refreshed in the backend, combines with the content of the newly added third region and displayed at a top position to form the new interface.

As described herein, in the embodiments of the present disclosure, meanings corresponding to various different gesture operations are pre-defined. The current interface is also pre-divided into a first region that may move along with the gesture operation and a second region that may not move along with the gesture operation. By detecting a gesture operation on the current interface, the current interface may be switched to a new interface that includes the content of the first region when the gesture operation corresponds to a predetermined gesture. Such switching of the interfaces achieves a natural transition from the current interface display to the new interface display in accordance with the gesture operation, and thus enhances user experience.

More details of method 10 for processing interface displays according to embodiments of the present disclosure are further described below.

Figure 2:
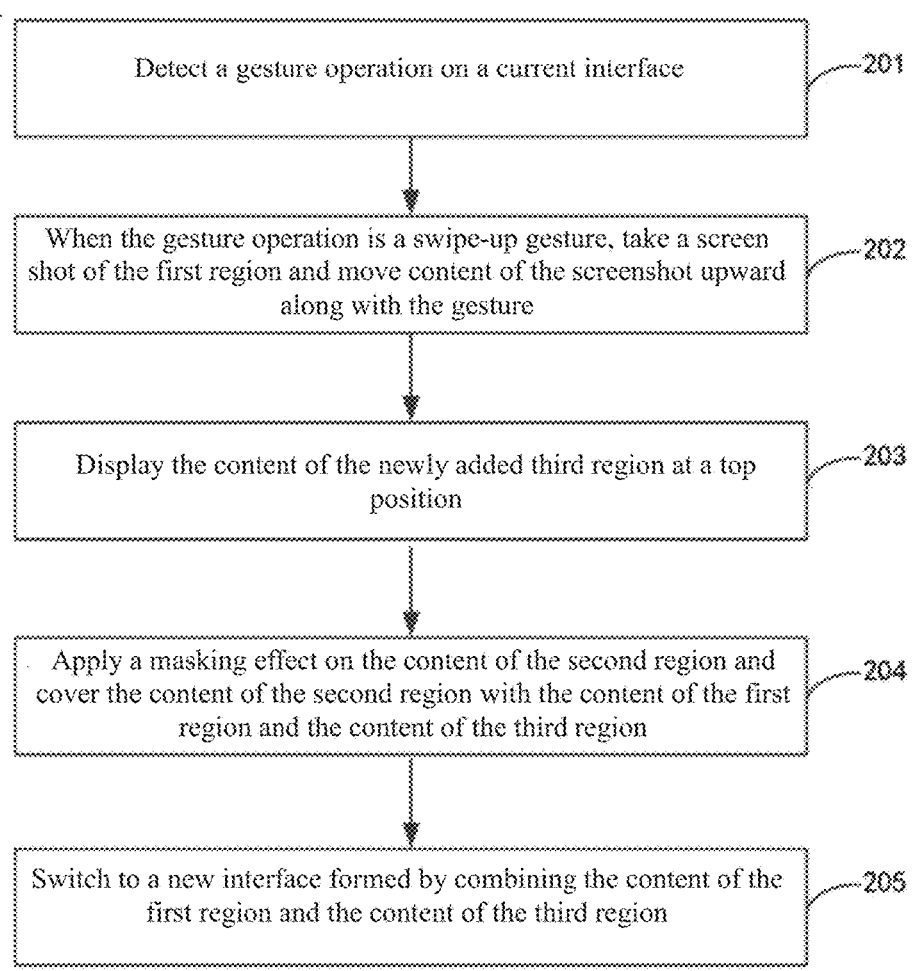
FIG. 2 depicts a flow chart illustrating a method for processing interface displays, according to embodiments of the present disclosure.

FIG. 2 depicts a flow chart illustrating an exemplary method 10 for processing interface displays according to a swipe-up operation.

As shown in FIG. 2, method 10 includes:

Step 201: Detect a gesture operation on a current interface.

The current interface is pre-divided into a first region that may move along with the gesture operation and a second region that may not move along with the gesture operation.

As described above, the first region may include one or more sub-regions, such as a navigation region and a content region. The content region may be an information flow or may display at least a part of an information flow.

The information flow may include a collection of content of multiple information channels. In the current interface, a collection of the content of at least one channel is at least partially displayed, which, for example, may be a collection of the content of sports, science and technology, and any other channels of the information flow.

Step 202: When the gesture operation is detected as a swipe-up gesture, generate a picture of the content in the first region and then move the picture upward along with the gesture.

The picture may be generated by converting the content displayed in the first region into a picture file format. As described above, the first region may include one or more sub-regions, such as a navigation region and a content region. The content region may be an information flow or may display at least a part of an information flow, for example, an information flow containing content of news information. When the gesture operation is detected as a swipe-up gesture and/or determined to be in the first region, method 10 of the present disclosure generates a picture of the content of the first region of the current interface. After the picture of the first region is generated, the picture including the content of the first region is then moved upward along with the gesture operation. The current interface remains unchanged as an underlying layer below the picture.

For example, when a suitable swipe-up gesture operation is detected, method 10 replaces the movement of the actual content of the information flow with the movement of the picture of the content of the first region along with the gesture operation. This allows the user to visually experience a seamless switching movement. The picture of the content of the information flow that is displayed in the first region slides up along with the swipe-up gesture operation, while the actual current interface remains as an underlying layer below the picture and/or the movement of the picture.

As described herein, the content of the first region displayed in the current interface and/or new interface may refer to at least a part of the content of the information flow that is displayed in the first region. During the movement of the content of the first region according to the gesture operation, the content of the first region may refer to the content of the picture, i.e., at least a part of the content of the information flow that is displayed in the first region and converted into the picture.

Step 203: Display the content of the newly added third region at a top position.

The third region may be a title bar region of an information flow. In this step, content of the title bar region is displayed at a top position of the new interface. The content of the newly added third region may be displayed at the top position by sliding into this position in a predetermined direction, such as from top to bottom, from left to right or from right to left, or may be directly displayed without such sliding action. The display of the third region may be suitably set in different operation platforms. For example, the third region may be displayed via a sliding action from top to bottom, similar to a dropping operation, in an Android platform, or may be directly displayed in an IOS platform (a mobile operating system developed by Apple) and so on, which is not limited in the present disclosure.

Thus, as described above, with the movement of the swipe-up gesture, the top position of the current interface may automatically display, e.g., drop, a third region. In some embodiments, the third region includes a row of title bar content, in which names of different information channels are set or displayed. The names may include, e.g., "recommended," "sports," "science and technology," etc. The title bar content may have a blue background, for example. Any other suitable color may be selected and used as the background color of the title bar or of the third region. The dropping of the content of the title bar that has a colored background, e.g., blue, and the movement of the content of the information flow of the first region from the bottom to the top contrast and complement each other, creating a visual effect. This visual effect makes the user perceptually sense that the upper third region and the lower first region are merged into a new interface at a level higher than the underlying current interface, which allows natural switching from the current interface to a new interface for browsing the information flow. This new interface becomes a home page of the information flow.

As described herein, there is no necessary sequential relationship between steps 202 and 203. Step 202 may be performed earlier or later than, or substantially at the same time with, step 203.

Step 204: While moving the picture of the content of the first region upward along with the swipe-up gesture operation, apply a masking effect on the content of the second region and cover the content of the second region with the content of the first region and the content of the third region.

This step performs a masking operation to display the content of the second region with a masking effect so as to visually make the content of the information flow, e.g., of the first region and/or the third region, separated from other parts, e.g., the content of the second region, creating a visual effect that the content of the information flow floats on a layer above the underlying layer, e.g., the current interface including the second region.

In some embodiments, the masking operation may gradually apply the masking effect on the second region. For example, as at least part of the underlying layer, the content of the second region may display an effect showing that the masking gradually becomes more opaque along with a gesture operation, such as a minor swipe-up gesture operation. In some embodiments, as the underlying layer, the current interface serves as an overall background region and may be applied with a black masking effect, gradually changing from about 0% to about 50% to imitate a depth-of-field effect. Such an effect can be achieved by setting the transparency of the mask. In this way, the whole gesture operation process is accompanied by a natural and smooth sliding effect. At the same time, along with the upward movement of the content of the information flow of the first region and the drop or display of the title bar content, the area of the second region gradually decreases until the content of the second region is covered by the new interface and disappears.

Step 205: Switch to a new interface formed by combining the content of the first region and the content of the third region.

This step includes, when it is detected that a moving distance of the swipe-up gesture operation is greater than or equal to a predetermined threshold distance, or a moving speed of the swipe-up gesture operation is greater than or equal to a predetermined threshold speed, combining the content of the first region with the content of the third region to form the new interface. As described above, the third region is newly added and displayed at the top position.

In this step, if the distance for which the content of the information flow, e.g., the picture of the content of the first region, moves upward along with the gesture operation is greater than or equal to a predetermined threshold distance, e.g., greater than or equal to $1/5$ a total slidable distance, the content of the information flow continues to move upward and attaches to the title bar content so as to switch to the new interface. As described above, the new interface is the home page of a multi-channel interface of the information flow, e.g., an interface that includes information and/or information portals of multiple information channels. As described herein, the total slidable distance refers to the initial distance between the content of the information flow and the title bar content. Such initial distance is mainly determined in accordance with the location of the content of the current information flow. Alternatively, if the speed at which the content of the information flow moves upward along with the gesture operation is greater than or equal to a predetermined threshold speed, e.g., greater than or equal to 2000 pixels/s (a unit of speed in Android platforms), the content of the information flow moves upward, and attaches and combines to the title bar content to form the new interface. In other situations, along with the release of the gesture operation, the interface may expand to restore to its initial state, e.g., the layout of the current interface.

In addition, when the content of the first region attaches to and combines with the content of the third region to form the new interface, if the moving speed of the swipe-up gesture operation is greater than or equal to a predetermined threshold speed, a rebound animation of the content of the first region is displayed when the content of the first region attaches to and combines with the content of the third region. In this instance, a rebound animation of the content of the first region may be displayed after the content of the information flow of the first region is put together with the title bar content of the third region so as to imitate a flexible rebound effect. The initial speed of the rebound may be the same as the speed at which the content of the information flow of the first region comes into contact with the title bar content of the third region. The rebound distance may be $1/6$ of the distance of the first region moved to combine with the third region, but may be any suitable distance and is not limited herein.

The rebound animation may be implemented by using a ValueAnimator class in Android platforms. Typically, the use of the ValueAnimator class changes a value into another value, in accordance to which the attribute of a View object, e.g., the position, transparency, rotational angle, size, etc., is dynamically modified based on certain rules to implement the animation effect. Thus, method 10 may implement a rebound animation effect by modifying one or more layout parameters of the content of the information flow of the first region and the title bar content of the third region when updating the interface display progress.

In this step, when the content of the first region attaches to and combines with the content of the third region to form the new interface, the edge regions of the content of the first region and the content of the third region may be displayed with a gradual shadow. That is, during the sliding of the content of the first region, the upper and lower edges of the content of the information flow of the first region and the title bar content of the third region may display a fade-in outer shadow effect on a scale ranging from about 0% to about 100%, which may thus enrich the overall three-dimensional sense of the interface display.

In addition, in this step, various icons of the toolbar region of the current interface may be moved and merged to the middle and displayed as one icon. During the movement of the swipe-up gesture operation, the icons in the toolbar region at the bottom of the current interface may be gradually merged. For example, when there are five icons in the toolbar region at the bottom of the current interface, all five icons may move to the middle with a display of a fade-out effect on a scale ranging from about 100% to about 0% and a scaling effect by a proportion ranging from about 100% to about 95%. Finally, the five icons are merged, leaving one icon to be displayed. For example, only a back-to-home page icon may be displayed at the bottom of the created new interface, i.e., merged into the multi-channel interface of the information flow. As described herein, the multi-channel interface may refer to an interface of the information flow that includes information from multiple channels.

As described herein, the change in the toolbar region to display one icon is exemplary, and is not limited thereto. In some situations, it is may be desirable to display two icons or not to display any icons. In other situations, the toolbar region may not be changed. Method 10 may perform the operations as described above in accordance with different platforms. For example, five icons of toolbars are merged into a back-to-home page icon in an Android platform, or the icons of the toolbar region are not changed in an IOS platform, etc.

In some embodiments, method 10 may further include that, after detecting that the back-to-home page icon in the toolbar region of the created new interface is touched, pressed, or clicked, a first region in the returned home page will display the content of a corresponding channel displayed in the new interface. For example, after switching to the new interface, if the back-to home page icon is clicked by the user when viewing the content of an entertainment channel via the new interface, in the returned home page, the first region, i.e., the information flow region, displays the content of such entertainment channel, enhancing user experience.

As described above, when a swipe-up gesture operation is detected, a picture of the content of the information flow displayed in the first region of the current interface is generated. The picture moves upward along with the gesture operation, and the title bar content is displayed at a top position. The content of the information flow combines with the title bar content to form a new interface to achieve a natural transition or switching of the interface display in accordance with the swipe-up gesture operation, and thus enhances user experience. As described herein, the content of the first region displayed in the current interface or in the new interface when combined with the title bar region or title bar content may refer to the content of the information flow at least partially displayed in the first region. During its movement, the content of the first region may refer to the content in the picture generated from the content of the first region or from the content of the information flow at least partially displayed in the first region.

Figure 3:
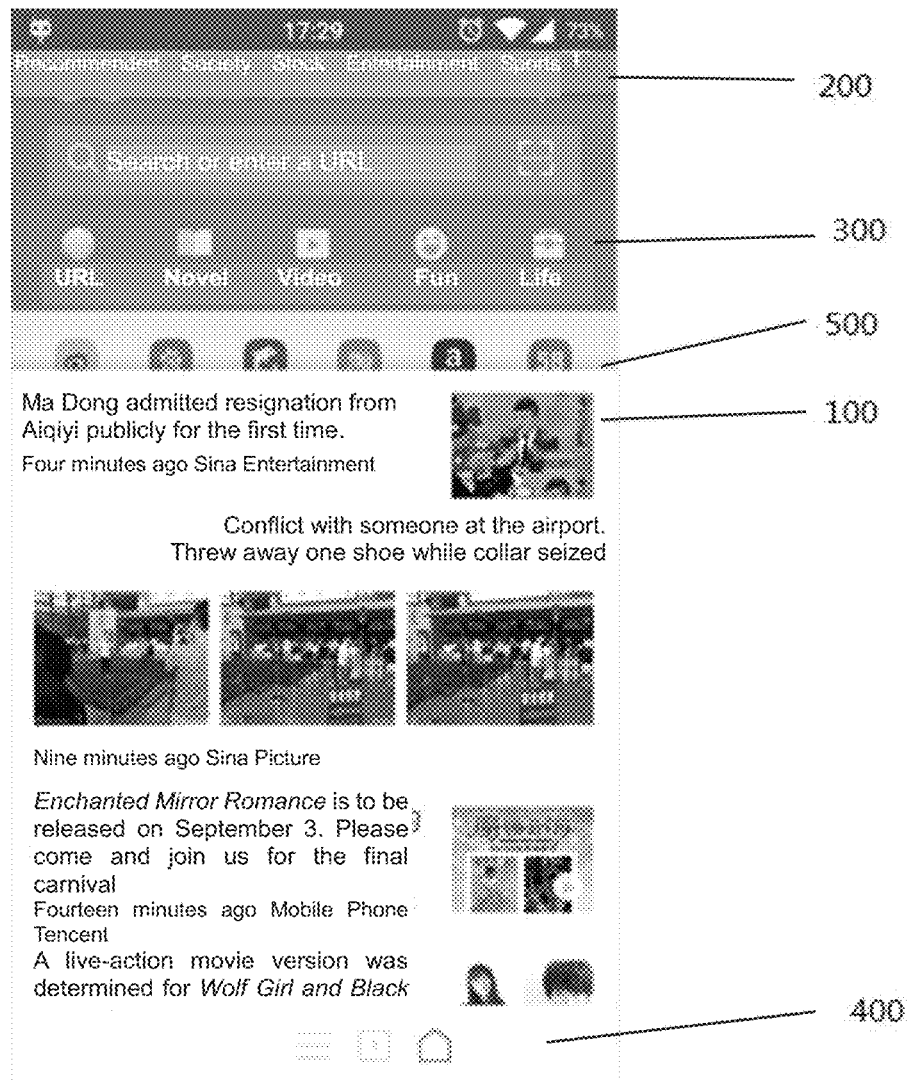
FIG. 3 depicts a schematic diagram illustrating an exemplary interface display, according to embodiments of the present disclosure.

FIG. 3 depicts a schematic diagram illustrating an exemplary interface display, according to an embodiment of the present disclosure.

As shown in FIG. 3, the displayed interface includes four regions (also referred to as View objects): an information flow region 100, a title bar region 200, an underlying background region 300, and a toolbar region 400. In addition, the information flow region 100 has an edge region 500. Edge region 500 may be displayed with a shadow effect.

As described herein, during the swiping-up gesture operation, the moving distance of a finger is referred to as Δy and a moving speed of the finger is referred to as Δv. In accordance with the moving distance of the finger Δy, information flow region 100 moves upward along with the finger. Title bar region 200 substantially synchronously slides or drops down from the top of the interface. Finally, information flow region 100 attaches to and combines with title bar region 200 to form a new interface.

In the above four regions, toolbar region 400 may remain unchanged, e.g., not moved. The movement of those three regions, i.e., information flow region 100, title bar region 200, and underlying background region 300, may be performed as described below.

A percentage of movement may be calculated from a ratio of the moving distance of the finger Δy to a distance between information flow region 100 and title bar region 200 (i.e., the total slidable distance). Then the distances for which the three regions, i.e., information flow region 100, title bar region 200, and underlying background region 300, which are three View objects, need to move are calculated in accordance with the calculated percentage of movement.

In some embodiments, underlying background region 300 may be set to move upward and/or shrink at a speed Δv/2 (i.e., ½ of the moving speed of the finger). The movement of underlying background region 300 is not limited herein, and may be moved and/or shrunk at another suitable speed.

The effects of the movement of one or more of the regions may be achieved by directly setting one or more layout parameters of the View objects corresponding to the regions respectively.

For example, for title bar region 200, setting the parameters of mTitleView may set the coordinates of its left, right, top, and bottom positions to achieve its movement, e.g., mTitleView.layout (left, top, right, bottom).

For edge region 500, the shadow effect may be achieved by applying a fade-in outer shadow effect to the upper and lower edges of information flow region 100 and/or title bar region 200 according to a gradient scale ranging from about 0% to about 100%.

Figure 4:
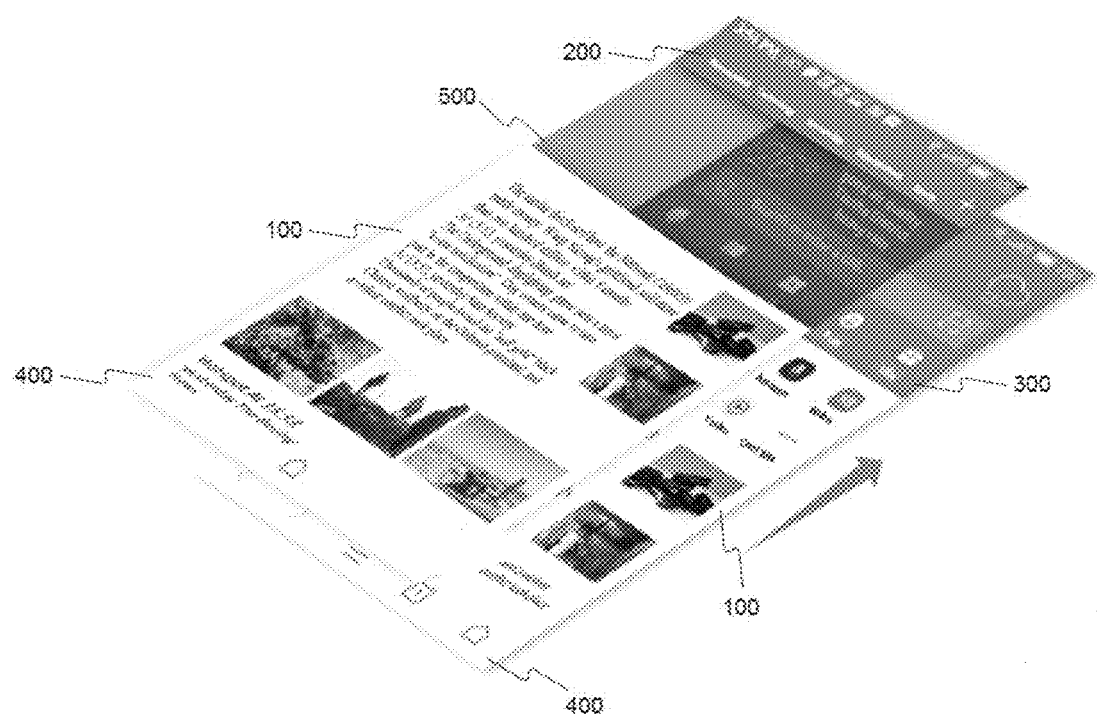
FIG. 4 depicts a perspective view of schematic diagrams illustrating a method for processing interface displays, according to embodiments of the present disclosure.

FIG. 4 depicts a perspective view of schematic diagrams illustrating method 10 for processing interface displays as described above. FIG. 4 shows an upper layer and a bottom layer to illustrate the switching from the current interface to the new interface in accordance with the gesture operation.

As shown in FIG. 4, the underlying layer is the current interface, and the movable upper layer includes a picture of the content of information flow region 100 and title bar region 200, which slides in from the top of the upper layer. A part of the underlying layer or the current interface, corresponding to an intermediate region between information flow region 100 and title bar region 200, displays a masking effect.

Figure 5:
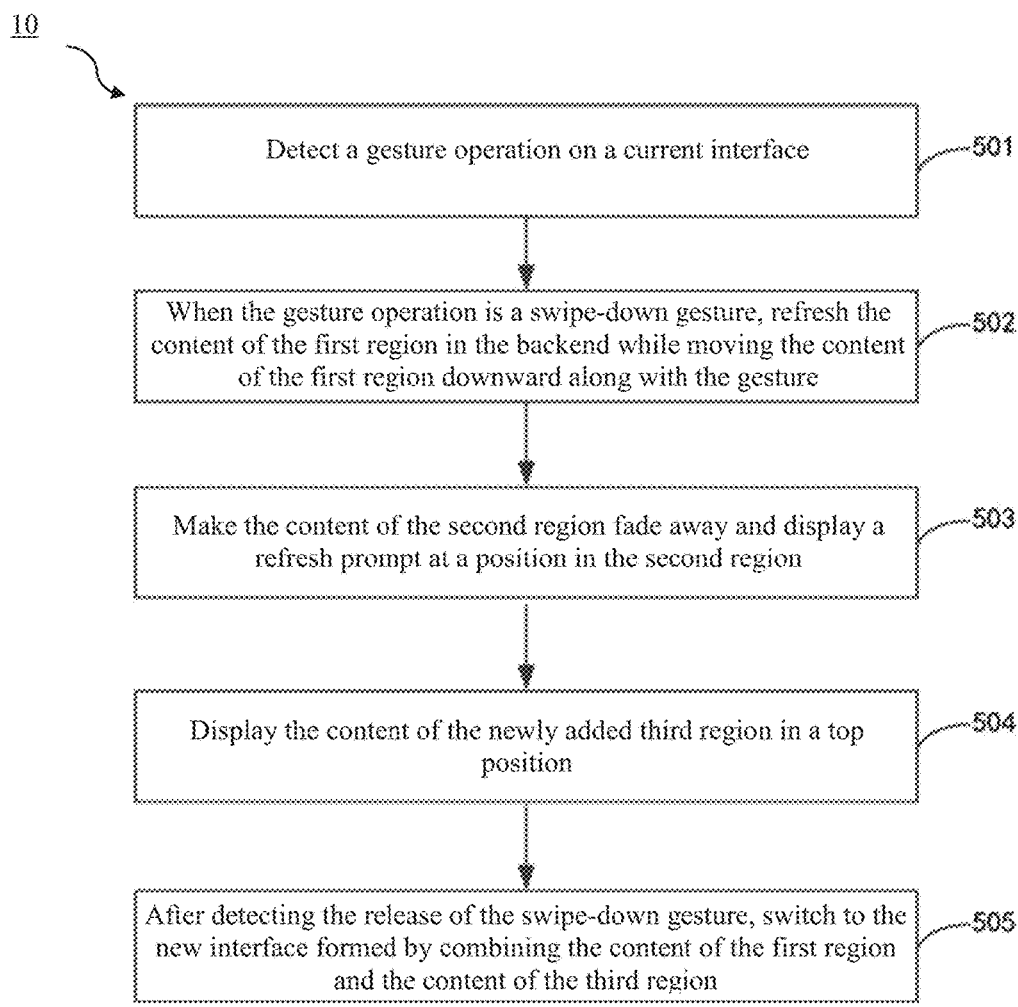
FIG. 5 depicts a flow chart illustrating a method for processing interface displays, according to embodiments of the present disclosure.

FIG. 5 depicts a schematic flow chart illustrating an exemplary method 10 for processing interface displays according to a swipe-down operation according to an embodiment of the present disclosure.

As shown in FIG. 5, method 10 includes:

Step 501: Detect a gesture operation on a current interface.

The current interface is pre-divided into a first region that may move along with the gesture operation and a second region that may not move along with the gesture operation.

As described above, the first region may include one or more sub-regions, such as a navigation region and a content region. The content region may be an information flow or may display at least a part of an information flow.

The information flow may include a collection of content of multiple information channels. In the current interface, a collection of the content of at least one channel is at least partially displayed, which, for example, is a collection of content of sports, science and technology, and other channels of the information flow.

Step 502: When the gesture operation is detected as a swipe-down gesture, refresh the content of the first region in the backend while moving the first region downward along with the gesture.

Typically, when a user browses information content in a home page interface, if the user wants to refresh the content, the user may use a swipe-down gesture to refresh the information. Thus, in this step, when the gesture operation corresponds to a predetermined swipe-down gesture, the content of the first region in the current interface is moved downward and a backend refresh operation on the content of the first region is triggered.

Step 503: The content of the second region fades away and a refresh prompt is displayed at a position in the second region.

As described herein, there is no necessary sequential relationship between steps 502 and 503. Step 502 may be performed earlier or later than step 503, or substantially at the same time with step 503.

The content of the second region may include content of sub-regions, e.g., regions including content of weather, search, and navigation portal. The content of the second region may move down slightly and display a fade-away effect, and display a predetermined color, e.g., blue, as a background color. Meanwhile, a refresh prompt is displayed at a position in the second region to inform the user to refresh and enter a new interface.

The fading away of the content of the second region may include drawing and deforming the lower edge of the content of the second region by pulling the lower edge downward, while making the content of the second region fade away.

Drawing and deforming the lower edge of the second region may include drawing and deforming the lower edge of the region content of the second region according to a quadratic Bézier curve. For example, at least part of the regions of the weather, search, and navigation portal in the interface are drawn downward during the deformation transition.

In addition, when the content of the first region in the current interface moves downward for a predetermined threshold distance, the movement stops. At this point, only left or right swiping operations may be used to be effective.

Step 504: Display the content of the newly added third region at a top position.

As described above, the third region may be a title bar region of an information flow, e.g., title bar region 200. In this step, content of the title bar region is displayed at a top position at the new interface. The content of the newly added third region may be displayed at the top position by sliding into this position in a predetermined direction, such as from top to bottom, from left to right or from right to left, or may be directly displayed without any sliding action. The display of the third region may be suitably set in different operation platforms. For example, the third region may be displayed via a slide-in action from right to left in an Android platform, or may be directly displayed in an IOS platform, etc., which is not limited in the present disclosure.

As channels of the title bar content begin showing up one after another, it may be sensed by the user that a new interface is to be entered.

As described herein, there is no necessary sequential relationship between steps 502 and 504. Step 502 may be performed earlier or later than step 504, or substantially at the same time with step 504.

Step 505: After a release of the swipe-down gesture is detected, switch to a new interface formed by combining the content of the first region and the content of the third region.

In this step, after the release of the swipe-down gesture is detected, a fast rebound animation effect may be used to bounce and move upward the content of the information flow region, push away the content of other parts, and then attach the content of the information flow region to the title bar content to create the new interface, thereby switching to the new interface.

In addition, in this step, icons in the toolbar region of the current interface may be moved to the middle, and merged and displayed as one icon.

For example, during the movement of the swiping-down gesture operation, icons in the toolbar region at the bottom of the current interface may be gradually merged. For example, when there are five icons in the toolbar region at the bottom of the current interface, all five icons may move to the middle while displaying a fade-out effect on a scale ranging from about 100% to about 0% and a scaling effect by a proportion ranging from about 100% to about 95%. Finally, the five icons are merged, leaving one icon to be displayed. For example, only a back-to home page icon may be displayed at the bottom of the created new interface, i.e., merged into the multi-channel interface of the information flow.

As described herein, the change in the toolbar region to display one icon is exemplary, and is not limited thereto. In some situations, it may be desirable to display two icons or not to display any icons. In other situations, the toolbar region may not be changed. Method 10 may perform the operations as described above in accordance with different platforms. For example, five icons of the toolbar region are merged into a back-to home page icon in an Android platform, or the icons of the toolbar region are not changed in an IOS platform, etc.

In some embodiments, method 10 may further include that, after detecting that the back-to-home page icon in the toolbar region of the newly created interface is touched, pressed, or clicked, a first region in the returned home page will display the content of a corresponding channel displayed in the new interface. For example, after switching to the new interface, if the back-to-home page icon is clicked by the user when viewing the content of an entertainment channel via the new interface, in the returned home page, the first region, i.e., the information flow region, displays the content of such entertainment channel, thus enhancing user experience.

As described above, when a swipe-down gesture operation is detected, the content of the information flow of the current interface moves downward along with the gesture, and the content of the information flow region is refreshed. The title bar content is displayed at a top position. The refreshed content of the information flow region combines with the title bar content to form a new interface to achieve a natural transition or switching of the interface display in accordance with the swipe-down gesture operation, and thus enhances user experience.

Figure 6:
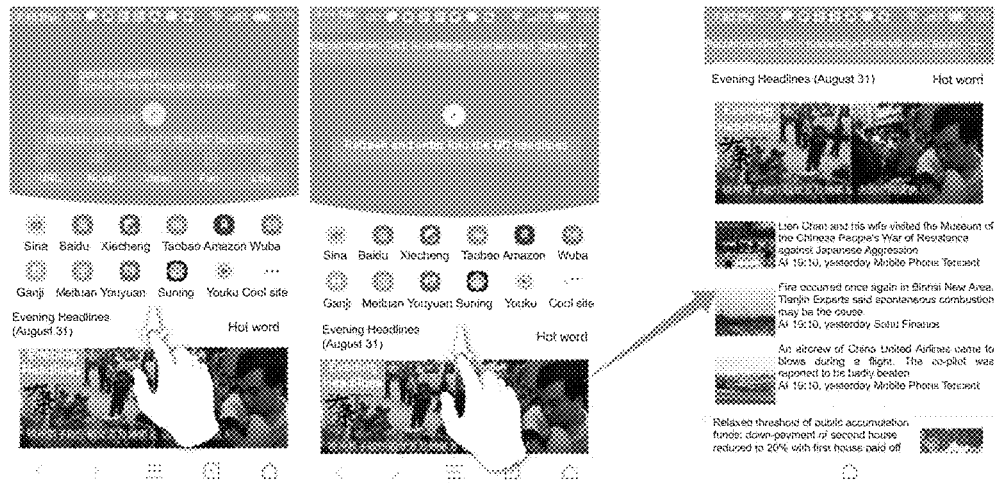
FIG. 6 depicts schematic diagrams illustrating a method for processing interface displays, according to embodiments of the present disclosure.

FIG. 6 depicts schematic diagrams illustrating method 10 for processing interface displays according to a swipe-down operation, according to an embodiment of the present disclosure.

As shown in FIG. 6, along with the swipe-down gesture operation, at first, method 10 draws and deforms the lower edge of the content of the second region of the current interface by moving at least a part of the lower edge downward, during which the content of the second region fades away and a blue color is displayed as a background color. Then a refresh prompt is displayed at a position, e.g., a middle position, in the second region to inform the user to refresh and enter a new interface. Finally, after the swipe-down gesture is released, method 10 applies a fast animation effect on the content of the information flow region to push away content of other parts and attach the content of the information flow region to the title bar content to create the new interface.

Figure 7:
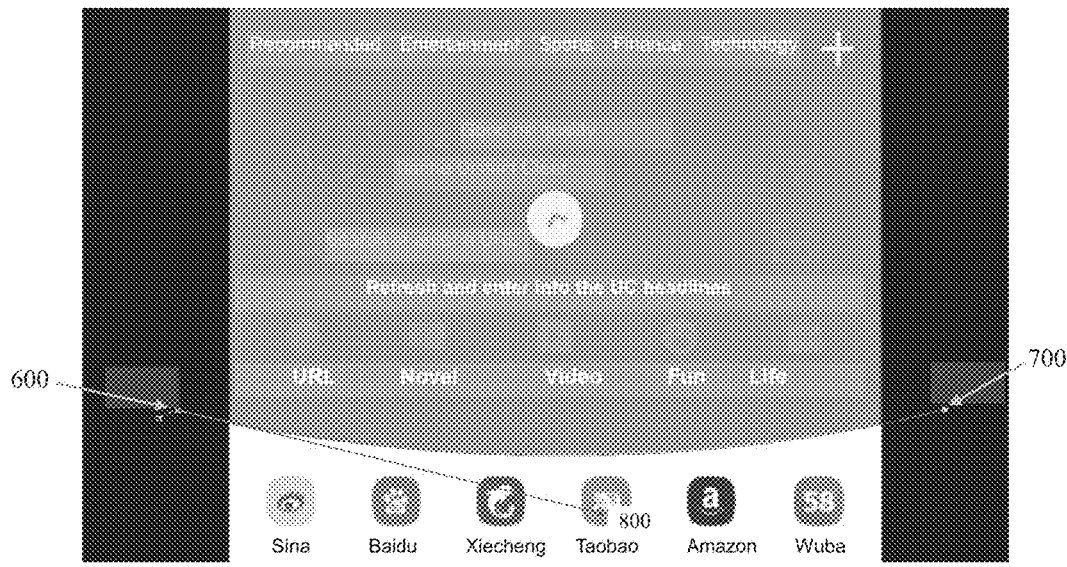
FIG. 7 depicts a schematic diagram illustrating a method for processing interface displays, according to embodiments of the present disclosure.

FIG. 7 depicts a schematic diagram illustrating method 10 for processing interface displays according to a swipe-down gesture operation, according to an embodiment of the present disclosure.

As shown in FIG. 7, during the swipe-down gesture operation, method 10 draws and deforms the lower edge of the content of the second region of the current interface by drawing the lower edge downward according to a quadratic Bézier curve.

The drawing and deforming of the lower edge of the content of the second region according to the swipe-down gesture operation may include the following stages.

A first stage is a uniform drawing-down stage. In this stage, according to the moving distance of the finger $\Delta y$, the content of the information flow region moves downward along with the gesture operation, and the lower edge of the content of the second region is drawn and deformed downward. During the drawing and deforming process, the elements in the content of the second region, e.g., text, icons, etc., become smaller and fade out while moving downward along with the gesture. Finally, at a position in the second region, e.g., a center position, a refresh prompt and a refresh icon are displayed.

A second stage is a swipe-down damping stage. In this stage, along with the continuing swipe-down operation of the finger, the content of the information flow region may move downward at a speed of about Δv/3, which is about ⅓ of the moving speed of the finger, to imitate a pulling resistance effect. As described herein, the moving speed Δv/3 is exemplary for the purpose of illustration, and is not limited herein. Any suitable speed less than the moving speed of the finger may be used. In this process, the refresh prompt and icon displayed at the center of the interface or at the center of the second region and the content of the information flow region move downward slowly.

A third stage is a swipe-down boundary stage. In this stage, after the finger moves down and reaches a lower threshold, i.e., after the content of the information flow region moves downward for a predetermined threshold distance or to a predetermined lower location, the content of the information flow region may not move downward along with the swipe-down gesture operation of the finger. At this point, other gesture operations, such as swipe-left or swipe-right gesture operations, may be effective to trigger other operations.

As described above, the lower edge of the content of the second region of the current interface can be drawn and deformed downward according to a quadratic Bézier curve. As shown in FIG. 7, for example, a starting point 600, an end point 700, and a control point 800 are illustrated. Control point 800 is the touch point of a finger touching the interface. The coordinates of control point 800 are coordinates of the touch position of the finger of a user. During the drawing and deforming process, starting point 600 and end point 700 move downward along with the finger Δy slowly. Control point 800 moves downward with the finger quickly. As the distance between control point 800 and starting point 600 and end point 700 becomes greater, the curvature of the curve becomes more obvious.

Method 10 according to the embodiments of the present disclosure may perform the above-described drawing and deforming process by rewriting an onDraw function through a customized View, and by drawing and filling a curve region through a Path object, and triggering redrawing of the View during the swipe-down movement of the finger. This set of operations allows the movement of the curve to follow the gesture operation.

Method 10 for processing interface displays are described above in detail. Correspondingly, the present disclosure further provides an apparatus for processing interface displays that perform one or more steps of method 10.

Figure 8:
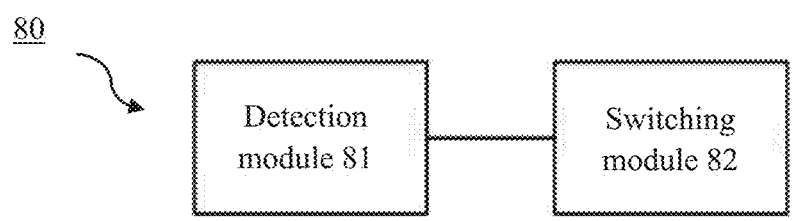
FIG. 8 depicts a block diagram illustrating an exemplary apparatus for processing interface displays, according to embodiments of the present disclosure.

FIG. 8 depicts a block diagram illustrating an exemplary apparatus 80 for processing interface displays, according to embodiments of the present disclosure.

As shown in FIG. 8, apparatus 80 includes a detection module 81 and a switching module 82.

Detection module 81 is used for detecting a gesture operation on a current interface, the current interface being pre-divided into a first region that may move along with the gesture operation and a second region that may not move along with the gesture operation.

As described above, the first region may include one or more sub-regions, such as a navigation region and a content region. In some embodiments, the content region may be an information flow or may display at least a part of an information flow. The information flow may include a collection of content of multiple information channels, and a collection of content of at least one channel is displayed in the current interface. The new interface may become a home page of an information flow.

In some embodiments, switching module 82 switches the current interface to the new interface that includes content of the first region when detection module 81 detects that the gesture operation corresponds to a predetermined gesture.

In some embodiments, switching module 82 switches the current interface to the new interface that includes content of the first region when the gesture operation corresponds to the predetermined gesture and the gesture operation is located in the first region.

As described herein, in the embodiments of the present disclosure, meanings corresponding to various different gesture operations are pre-defined. The current interface is also pre-divided into a first region that may move along with the gesture operation and a second region that may not move along with the gesture operation. By detecting a gesture operation on the current interface, the current interface may be switched to a new interface that includes content of the first region when the gesture operation corresponds to a predetermined gesture. Such switching of the interfaces achieves a natural transition from the current interface display to the new interface display in accordance with the gesture operation and enhances user experience.

Figure 9:
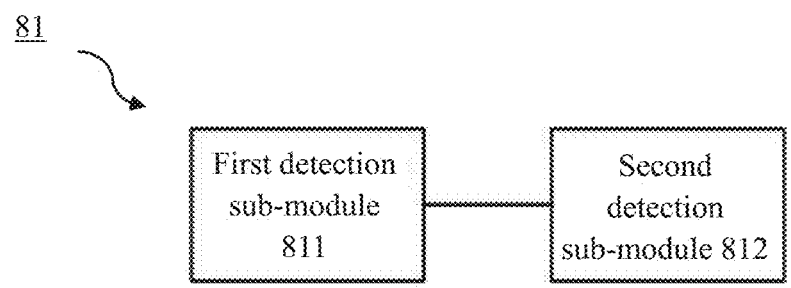
FIG. 9 depicts a block diagram illustrating an exemplary detection module in an exemplary apparatus for processing interface displays, according to embodiments of the present disclosure.

FIG. 9 depicts a block diagram illustrating an exemplary detection module 81 of apparatus 80, according to embodiments of the present disclosure.

As shown in FIG. 9, detection module 81 includes a first detection sub-module 811 and a second detection sub-module 812.

First detection sub-module 811 detects whether or not the gesture operation corresponds to the predetermined gesture.

Second detection sub-module 812 detects whether or not the gesture operation is located in the first region.

Switching module 82 of apparatus 80 switches the current interface to a new interface that includes content of the first region when first detection sub-module 811 detects that the gesture operation corresponds to the predetermined gesture and second detection sub-module 812 detects that the gesture operation is located in the first region.

Figure 10:
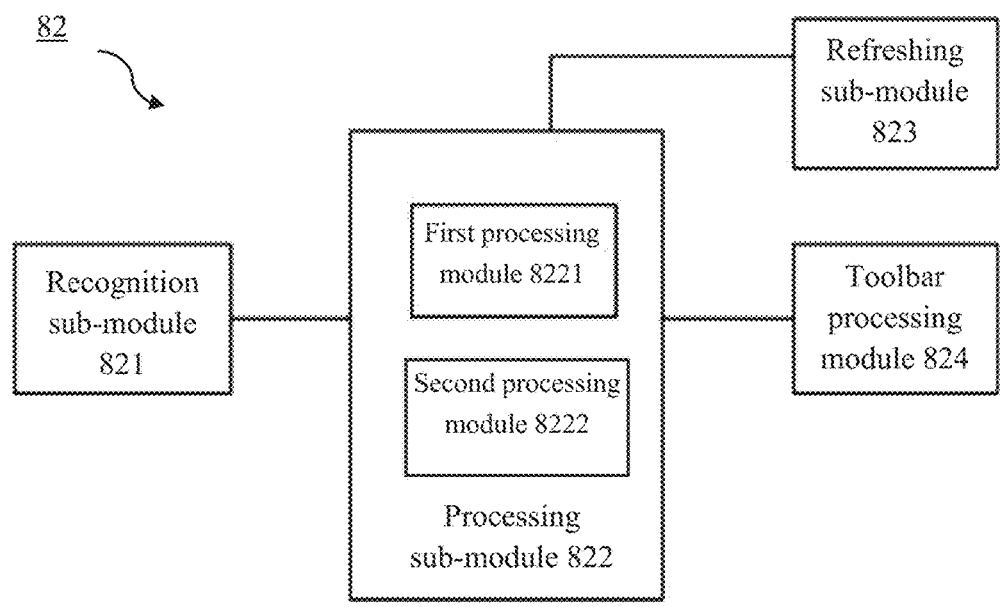
FIG. 10 depicts a block diagram illustrating an exemplary switching module in an exemplary apparatus for processing interface displays, according to embodiments of the present disclosure.

FIG. 10 depicts a block diagram illustrating an exemplary switching module 82 of apparatus 80, according to embodiments of the present disclosure.

As shown in FIG. 10, switching module 82 includes a recognition sub-module 821 and a processing sub-module 822.

Recognition sub-module 821 recognizes or determines the gesture operation detected by detection module 81 as a swipe-up gesture operation or a swipe-down gesture operation.

Processing sub-module 822 switches the current interface to a new interface that includes content of the first region and content of a third region that is newly added.

In some embodiments, switching module 82 further includes a refreshing sub-module 823.

Refreshing sub-module 823 refreshes the content of the first region in the backend.

When recognition sub-module 821 recognizes or determines that the gesture operation is the swipe-down gesture operation, processing sub-module 822 switches the current interface to the new interface that includes the content of the first region after being refreshed in the backend by refreshing sub-module 823 and the content of the third region.

Further, processing sub-module 822 includes a first processing module 8221 and a second processing module 8222.

When the recognition sub-module 821 recognizes or determines that the gesture operation is the swipe-up gesture operation, first processing module 8221 moves the content of the first region upward along with the swipe-up gesture to combine with the content of the third region, which is newly added and displayed at a top position, to create the new interface.

When the recognition sub-module 821 recognizes or determines that the gesture operation is the swipe-down gesture operation, second processing module 8222 refreshes the content of the first region in the backend while moving the content of the first region downward along with the gesture, and then rebounds the content of the first region to move upward and combine the content of the first region after being refreshed in the backend with the content of the third region.

The third region may be a title bar region of an information flow.

Further, when recognition sub-module 821 recognizes or determines that detection module 81 detects that a moving distance of the swipe-up gesture operation is greater than or equal to a predetermined threshold distance, or a moving speed of the swipe-up gesture is greater than or equal to a predetermined threshold speed, first processing module 8221 combines the content of the first region with the content of the third region to create the new interface.

After the recognition sub-module 821 recognizes or determines that detection module 81 detects the release of the swipe-down gesture operation, second processing module 8222 rebounds the content of the first region to move it upward to combine with the content of the third region to create the new interface.

The content of the newly added third region is displayed at the top position by a sliding-in action in a predetermined direction, such as from top to bottom, from left to right, or from right to left.

Further, when recognition sub-module 821 recognizes or determines that the gesture operation is the swipe-up gesture, first processing module 8221 moves a picture of the content of the first region upward along with the gesture after the picture is generated of the first region.

When first processing module 8221 moves the picture upward along with the gesture, first processing module 8221 applies a masking effect on the content of the second region and then covers the content of the second region with the content of the first region and the content of the third region.

Further, when recognition sub-module 821 recognizes or determines that the gesture operation is the swipe-down gesture, second processing module 8222 moves the content of the first region downward along with the gesture, makes the content of the second region fade away, displays a refresh prompt at a position in the second region, and refreshes the content of the first region in the backend.

Second processing module 8222 makes the content of the second region fade away by drawing and deforming the lower edge of the second region downward while making the content of the second region fade away.

Second processing module 8222 performs the drawing and deforming of the lower edge of the second region downward by drawing and deforming the lower edge of the second region downward according to a quadratic Bézier curve.

In some embodiments, switching module 82 further includes a toolbar processing module 824.

When the current interface is being switched to the new interface that includes the content of the first region, toolbar processing module 824 displays at least one of the icons in the toolbar region of the current interface in a toolbar region of the new interface.

Additionally or alternatively, after detecting that a back-to-home page icon in the toolbar region of the new interface is touched, toolbar processing module 824 displays in a first region of the returned home page the content of a corresponding channel displayed in the new interface.

The present disclosure further provides a device for processing interface displays that perform one or more steps of method 10.

Figure 11:
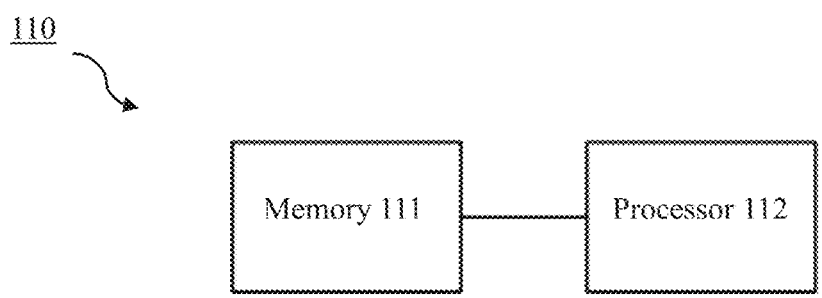
FIG. 11 depicts a block diagram illustrating an exemplary processing device for processing interface displays, according to embodiments of the present disclosure.

FIG. 11 depicts a block diagram illustrating an exemplary device 110 for processing interface displays, according to embodiments of the present disclosure. As shown in FIG. 11, device 110 includes a memory 111 and a processor 112. Memory 111 stores programs and/or a plurality of operations of method 10. Processor 112 executes the following programs and/or one or more operations of method 10 stored by memory 111.

Processor 112 may detect a gesture operation on a current interface, the current interface being pre-divided into a first region that may move along with the gesture operation and a second region that may not move along with the gesture. Processor 112 may switch the current interface to a new interface that includes content of the first region when the gesture operation corresponds to a predetermined gesture. Processor 112 may further execute the following programs or one or more operations of method 10 stored by memory 111.

When the gesture operation is the swipe-up gesture, processor 112 may move the content of the first region upward along with the gesture to combine with the content of the third region, which is newly added and displayed at a top position, to create the new interface. Additionally or alternatively, when the gesture operation is the swipe-down gesture, processor 112 may refresh the content of the first region in the backend while moving it downward along with the gesture, and then rebound the content of the first region to move upward, and combine the content of the first region after being refreshed in the backend with the content of the third region to create the new interface.

As described herein, reference can be made to the above described methods for other steps, programs, or operations of method 10 stored by memory 111, which will not be repeated herein. Processor 112 may be further used for executing other suitable programs or operations stored by memory 111, such as suitable applications for a mobile computing device.

Embodiments of the present disclosure may be used in various universal or dedicated computing systems or configurations, e.g., personal computers, handheld devices or portable devices, tablet devices, multi-processor systems, microprocessor-based systems, touchscreen-based electronic devices, programmable consumer electronic devices, video game consoles, computer entertainment devices, mini-computers, mobile computing devices, or any one of the above systems or devices, etc.

The present disclosure may be described in a general context of computer-executable commands or operations executed by a computing device, such as a program module, including at least one of a microprocessor, a processor, a central processing unit (CPU), a graphical processing unit (GPU), application specific integrated circuits (ASIC), or a Field Programmable Gate Array (FPGA). In general, the program module may include routines, procedures, objects, components, data structures, processors, memories, and the like for performing specific tasks or implementing a sequence of steps or operations. The present disclosure may also be implemented in a distributed computing environment, and in these distributed computing environments, tasks or operations may be executed by a remote processing device connected through a communication network, e.g., the Internet. In the distributed computing environment, the program module may be located in a local or a remote computer-readable storage medium, including storage devices, such as hard disks, floppy disks, or CD-ROMs, or other forms of RAM or ROM. Furthermore, although aspects of the disclosed embodiments are described as being associated with data and/or information stored in a memory and other tangible computer-readable storage mediums, one skilled in the art will appreciate that these aspects can also be stored on and executed from many types of tangible computer-readable media, such as secondary storage devices, like hard disks, floppy disks, or CD-ROMs, or other forms of RAM or ROM. Accordingly, the disclosed embodiments are not limited to the above-described examples, but instead are defined by the appended claims in light of their full scope of equivalents.

As will be understood by those skilled in the art, embodiments of the present disclosure may be embodied as a method, a device, an apparatus, or a computer program product. Accordingly, embodiments of the present disclosure may take the form of an embodiment made entirely of hardware, an embodiment made entirely of software embodiment, or an embodiment combining software and hardware. Furthermore, embodiments of the present disclosure may take the form of a computer program product embodied in one or more computer-readable storage media (including, but not limited to, a magnetic disk memory, a CD-ROM, an optical memory, and so on) containing computer-readable program codes.

Embodiments of the present disclosure are described with reference to flow diagrams and/or block diagrams of methods, devices (systems), apparatuses, and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including instruction means that implement the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions that are executed on the computer or other programmable devices provide steps for implementing the functions specified in one or more flows in the flow diagrams and/or one or more blocks in the block diagrams.

In a typical configuration, a computing device includes one or more central processing units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable medium. The memory is an example of a computer-readable medium.

The term "computer-readable storage medium" refers to any type of physical memory on which information or data readable by a processor may be stored. Thus, a computer-readable storage medium may store instructions for execution by one or more processors, including instructions for causing one or more processors to perform steps or stages consistent with the embodiments described herein. The computer-readable medium may include non-volatile and volatile media, and removable and non-removable media. The information storage can be implemented with any method or technology. Information may be modules of computer-readable instructions, data structures, and programs, or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage, or other magnetic storage devices, or any other non-transmission media that may be used to store information capable of being accessed by a computer device. The computer-readable medium is non-transitory and does not include transitory media, such as modulated data signals and carrier waves.

It should be noted that the relational terms such as "first" and "second" are only used to distinguish an entity or operation from another entity or operation, and do not necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items.

Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A method for processing interface displays, comprising:
   detecting a gesture operation on a current interface, the current interface being pre-divided into a first region and a second region, wherein the first region is configured to move along with the detected gesture operation;
   switching from the current interface to a new interface that includes content of the first region when the gesture operation is determined to be corresponding to a predetermined gesture, wherein the content of the first region moves along with the detected gesture operation to combine with content of a third region to form the new interface; and
   displaying, in the third region, a name of at least one of multiple information channels.

2. The method of claim 1, wherein the first region includes a content region that displays at least a part of an information flow.

3. The method of claim 2, wherein the information flow includes a collection of content of the multiple information channels, and a collection of content of at least one channel is at least partially displayed in the current interface.

4. The method of claim 2, wherein the second region does not move with the detected gesture operation.

5. The method of claim 1, further comprising switching to the new interface when the gesture operation is determined to be located in the first region.

6. The method of claim 4, wherein,
   the gesture operation is a swipe-up gesture or a swipe-down gesture; and
   the new interface includes the content of the first region and content of the third region.

7. The method of claim 6, further comprising:
   when the gesture operation is the swipe-down gesture, switching to the new interface after refreshing the content of the first region in the backend.

8. The method of claim 6, further comprising:
   when the gesture operation is the swipe-up gesture, generating a picture of the content of the first region and moving the picture upward along with the gesture, wherein the picture includes the content of the information flow at least partially displayed in the first region.

9. The method of claim 6, further comprising:
   when the gesture operation is the swipe-up gesture,
   upon determining that a moving distance of the swipe-up gesture is greater than or equal to a predetermined threshold distance, or a moving speed of the swipe-up gesture is greater than or equal to a predetermined threshold speed, moving the content of the first region upward along with the gesture to combine with the content of the third region to form the new interface; or
   when the gesture operation is the swipe-down gesture, moving the content of the first region downward along with the gesture,
   refreshing the content of the first region in the backend,
   when detecting a release of the swipe-down gesture, rebounding and moving the content of the first region upward, and
   combining the content of the first region after being refreshed with the content of the third region to form the new interface.

10. The method of claim 6, wherein the third region is a title bar region of an information flow.

11. The method of claim 6, further comprising:
    applying a masking effect on the content of the second region, wherein the masking effect causes the content of the second region to appear behind the information flow, and then covering the content of the second region with the content of the first region and the content of the third region.

12. The method of claim 9, further comprising:
    when the moving speed of the swipe-up gesture is greater than or equal to the predetermined threshold speed, applying a rebound animation to the content of the first region when combining the content of the first region with the content of the third region.

13. The method of claim 9, further comprising:
    when combining the content of the first region with the content of the third region, displaying an outer shadow that fades in at an edge region connecting the first region and the third region.

14. The method of claim 9, further comprising:
    when the gesture operation is the swipe-down gesture, making the content of the second region fade away, and displaying a refresh prompt at a position in the second region.

15. The method of claim 14, further comprising:
    drawing and deforming a lower edge of the second region downward while making the content of the second region fade away.

16. The method of claim 9, further comprising:
    stopping the movement of the content of the first region after moving the content of the first region downward along with the gesture for a predetermined distance.

17. The method of claim 1, further comprising:
    displaying at least one of one or more icons of a toolbar region of the current interface in a toolbar region of the new interface.

18. The method of claim 1, further comprising:
    after switching to the new interface and detecting that a back-to-home page icon is clicked, returning to a home page and displaying in the first region in the home page the content of one of the multiple information channels displayed in the new interface.

19. An apparatus for processing interface displays, comprising:
    one or more processors; and
    a memory storing instructions that, when executed by the one or more processors, cause the apparatus to perform:
    detecting a gesture operation on a current interface, the current interface being pre-divided into a first region and a second region, wherein the first region is configured to move along with the detected gesture operation;
    switching from the current interface to a new interface that includes content of the first region when the gesture operation is determined to be corresponding to a predetermined gesture, wherein the content of the first region moves along with the detected gesture operation to combine with content of a third region to form the new interface; and
    displaying, in the third region, a name of at least one of multiple information channels.

20. A non-transitory computer-readable storage medium having processor-executable program codes, characterized in that the program codes cause a processor to execute the following steps of:
    detecting a gesture operation on a current interface, the current interface being pre-divided into a first region and a second region, wherein the first region is configured to move along with the detected gesture operation;

switching from the current interface to a new interface that includes content of the first region when the gesture operation is determined to be corresponding to a predetermined gesture, wherein the content of the first region moves along with the detected gesture operation to combine with content of a third region to form the new interface; and displaying, in the third region, a name of at least one of multiple information channels.

* * * * *